(12) United States Patent
Miao

(10) Patent No.: US 10,202,715 B2
(45) Date of Patent: Feb. 12, 2019

(54) ANNULAR FIBROUS PREFORM AND METHOD OF PREPARING THE SAME

(71) Applicant: Jiangsu Tianniao High Technology Co., Ltd., Jiangsu (CN)

(72) Inventor: Yunliang Miao, Jiangsu (CN)

(73) Assignee: Jiangsu Tianniao High Technology Co., Ltd., Jiangsu (CN)

( * ) Notice: Subject to any disclaimer, the term of this patent is extended or adjusted under 35 U.S.C. 154(b) by 98 days.

(21) Appl. No.: 14/771,706

(22) PCT Filed: Mar. 11, 2014

(86) PCT No.: PCT/CN2014/000249
§ 371 (c)(1),
(2) Date: Aug. 31, 2015

(87) PCT Pub. No.: WO2014/180159
PCT Pub. Date: Nov. 13, 2014

(65) Prior Publication Data
US 2016/0017526 A1    Jan. 21, 2016

(30) Foreign Application Priority Data

May 7, 2013    (CN) .......................... 2013 1 0164378

(51) Int. Cl.
*D04H 1/4374*    (2012.01)
*D04H 1/76*    (2012.01)
(Continued)

(52) U.S. Cl.
CPC ............. *D04H 1/4374* (2013.01); *B32B 5/00* (2013.01); *D04H 1/4242* (2013.01); *D04H 1/46* (2013.01);
(Continued)

(58) Field of Classification Search
CPC .......... D04H 1/46; D04H 1/4242; D04H 1/76; D04H 1/4374; D04H 1/498; D04H 3/102;
(Continued)

(56) References Cited

U.S. PATENT DOCUMENTS

| 4,955,123 A | 9/1990 | Lawton et al. |
| 5,323,523 A | 6/1994 | Lawton et al. |

(Continued)

FOREIGN PATENT DOCUMENTS

| CN | 1191583 | 8/1998 |
| CN | 1212034 | 3/1999 |

(Continued)

*Primary Examiner* — Amy Vanatta
(74) *Attorney, Agent, or Firm* — McDonnell Boehnen Hulbert & Berghoff LLP

(57) ABSTRACT

Disclosed are an annular fibrous preform and a method of preparing the same. The preform is formed by superposing and needle-punching annular units (5) containing an annular composite fabric (4), and the annular composite fabric (4) is shaped by needle-punching sector-shaped fibrous fabric (3) of the same type with an annular fibrous web (1) in advance. The method of preparing a preform involves needle-punching an annular fibrous fabric (2) formed of abutted sector-shaped fibrous fabrics with an annular fibrous web (1) in advance and fixedly joining the same into an annular composite fabric (4), and then needle-punching and forming annular units (5) to realize the preparation of the annular fibrous preform. The present method effectively eliminates the occurrence of deformation and misplacement of sector-shaped abutted fibrous fabric during needle-punching at a later stage such that the in-plane and interlayer uniformity and consistency are good, and has advantages such as high fiber content, excellent mechanical performance, and a high utilization rate of raw material, so that the friction performance of friction material is improved after a C/C composite is formed, and the combination property is excellent. The (Continued)

method can be applied to the production of composite material preforms for aircraft brake discs, and can also be applied to the production of friction material preforms in baking systems of high-speed trains and high-end automobiles.

6 Claims, 3 Drawing Sheets

(51) Int. Cl.
*D04H 1/46* (2012.01)
*D04H 1/4242* (2012.01)
*D04H 1/498* (2012.01)
*B32B 5/00* (2006.01)
B32B 5/06 (2006.01)
B32B 5/26 (2006.01)
B32B 5/02 (2006.01)
B32B 5/10 (2006.01)
B32B 3/14 (2006.01)
B32B 3/18 (2006.01)
B32B 3/26 (2006.01)

(52) U.S. Cl.
CPC ............... *D04H 1/498* (2013.01); *D04H 1/76* (2013.01); *B32B 3/14* (2013.01); *B32B 3/18* (2013.01); *B32B 3/266* (2013.01); *B32B 5/022* (2013.01); *B32B 5/06* (2013.01); *B32B 5/10* (2013.01); *B32B 5/26* (2013.01); *B32B 2262/106* (2013.01); *B32B 2307/54* (2013.01); *B32B 2307/542* (2013.01); *B32B 2307/718* (2013.01); *B32B 2307/734* (2013.01); *B32B 2475/00* (2013.01); *B32B 2605/00* (2013.01); *B32B 2605/08* (2013.01); *B32B 2605/18* (2013.01)

(58) Field of Classification Search
CPC ........ D04H 3/105; D04H 5/02; D04H 13/005; D04H 1/70; D04H 3/05; B32B 5/00; B32B 3/14; B32B 2262/106; B32B 3/18; B32B 5/022; B32B 5/26; B32B 5/06

USPC .................................... 28/107, 110
See application file for complete search history.

(56) References Cited

U.S. PATENT DOCUMENTS

| | | | | |
|---|---|---|---|---|
| 5,546,880 | A | * | 8/1996 | Ronyak ................. B29C 70/228 112/420 |
| 5,609,707 | A | * | 3/1997 | Bazshushtari ........... D04H 1/46 156/148 |
| 5,662,855 | A | * | 9/1997 | Liew ...................... D04H 18/02 156/184 |
| 5,705,264 | A | | 1/1998 | Lawton et al. |
| 5,792,715 | A | | 8/1998 | Duval et al. |
| 5,869,411 | A | | 2/1999 | Bazshushtari et al. |
| 5,882,781 | A | * | 3/1999 | Lawton .................. D01G 25/00 428/293.1 |
| 6,009,605 | A | * | 1/2000 | Olry ........................ B29B 11/16 28/107 |
| 6,029,327 | A | * | 2/2000 | Sheehan ................. B29B 11/04 156/148 |
| 6,105,223 | A | * | 8/2000 | Brown ..................... D04H 1/46 28/107 |
| 6,691,393 | B2 | | 2/2004 | James et al. |
| 2005/0235471 | A1 | * | 10/2005 | Delecroix .............. D04H 1/498 28/107 |
| 2011/0033622 | A1 | * | 2/2011 | La Forest ............... C04B 35/83 427/249.2 |

FOREIGN PATENT DOCUMENTS

| | | |
|---|---|---|
| CN | 1408920 | 4/2003 |
| CN | 1656270 | 8/2005 |
| CN | 1945048 | 4/2007 |
| CN | 101503844 | 8/2009 |
| CN | 101575766 | 11/2009 |
| CN | 102108604 | 6/2011 |
| CN | 102990799 | 3/2013 |
| CN | 102992798 | 3/2013 |
| CN | 103233323 | 8/2013 |
| EP | 0232059 | 9/1994 |
| EP | 0767265 | 12/2000 |
| EP | 2282075 | 2/2011 |
| FR | 2780420 | 12/1999 |

\* cited by examiner (a) (b) (c)

(a)　　　　　(b)　　　　　(c)

(a)　　　　　(b)

ANNULAR FIBROUS PREFORM AND METHOD OF PREPARING THE SAME

TECHNICAL FIELD

The present invention relates to the technical field of friction materials, in particular to a fibrous preform, such as an annular fibrous preform for aircraft carbon/carbon brake discs, and also an annular fibrous preform to be applied to friction material preform for high-speed trains and high-end automobiles etc.

BACKGROUND ART

The prior art generally uses a carbon substrate and a pre-oxidized fiber-reinforced or carbon fiber-reinforced composite to prepare brake discs, which, when comparing with the brake discs used to be prepared from powder metallurgy materials, have the advantages of good mechanical properties, good heat sink strength property, excellent friction performance, good product design. A prerequisite for the production of composite brake discs is to prepare an annular fibrous preform which exhibits excellent structural performance and ease of post-matrix densifying.

The prior art discloses an annular fibrous preform prepared by superposing and needle-punching an annular layer by means of a circular needle-punching station, where the annular layer is formed by alternatively abutting two sector-shaped segments obtained by cutting from an uni-directional fabric in which the filaments distributed in the radial and tangential direction of the eventual annulus (U.S. Pat. Nos. 5,323,523, 5,705,264, 4,955,123). Less material loss is achieved by this method as comparing with the method in which cutting is performed on the intact square or circular pieces, but loss due to cutting is still considerable. The two sector-shaped parts in the method are superposed alternatively, which renders the in-plane and interlayer uniformity poor, and that when there is an odd number of the sector-shaped segment in abutting, there exists two uneven and different bonding structures of fibers within the in-plane of the preform, which damages the overall uniformity of the preform, and when there is an odd number of the sector-shaped segment in abutting, the stability of the friction material would be affected ultimately; meanwhile, the long fiber content in the tangential direction of the braking force is low and uneven, abrasion and shock resistance of the friction material after the C/C composite is formed is poor; it is also evident that, abutting is used in the sector-shaped segment of the invention, which leads to unevenness in the in-plane and interlayer, the abutting site is relatively dense and thick, which blocks the passage for the subsequent deposition of the carbon substrate at a later stage, and renders the control of the composite-forming process more difficult, and makes a significant difference in performance in the interior of the friction material, poor operating stability; further, the more the individual layers of the sector-shaped units, the thicker is the preform, the more prominent is the difference, which makes the control of the overall structure and properties more difficult.

Another commonly reported preparation method involves superposing a fibrous fabric, followed by cutting the same into annular fibrous preforms after being subjected to needle-punching (U.S. Pat. No. 5,869,411, CN patent no. 96121709, 95191073 and CN02138191.7), from which, however, the shaped annular fibrous preform thus obtained has to be subjected to removal of materials in accordance with the shape and size to be used, and thus merely 30%-55% of utilization rate of raw material can be achieved, which leads to serious wasting problem of the raw materials. Furthermore, carbon fiber employs 0°/90° fiber superposing, and thus long fiber content on the rotation surface in the tangential direction of the braking force is relatively low, which affects the uniformity and stability of the product quality.

In addition, the use of pre-oxidized fiber in the preparation of annular fibrous preform has already been disclosed in the art, which, when comparing with the mature processes (CN101575766, CN1945048, CN101503844, CN02138191.7), is superior due to its strong textile operability, which facilitates the formation of a preform that exhibits the desired characteristics by forming into short fiber felts and long fibrous fabric to be alternatively overlaid and needle-punched. However, this technique has some drawbacks. Firstly, the above-mentioned method involves also removal of material in order to obtain an annular fibrous preform, utilization rate of raw material are low; secondly, a better strength of the pre-oxidized fiber can only be achieved after tension carbonization, but with significantly poorer mechanical characteristics and greater wide spreading effect as comparing with that of the carbon fiber; further, carbonization readily leads to deformation of the pre-oxidized fibrous preform. Since pre-oxidized fiber and carbon fiber have different thermal expansion coefficient, when pre-oxidized fiber is used in combination with carbon fiber, uneven distribution of the internal stress occurs in the subsequent high temperature carbonization, which makes the control over the process more difficult and affects the functional performance of the material.

There are still rooms for improvements with respect to the above-mentioned shortcomings.

DISCLOSURE OF THE INVENTION

For the deficiencies of the prior art, the present invention provides an annular fibrous preform, said preform has such advantages as high overall uniformity, stable structure, high fiber content, excellent mechanical performance, high utilization rate of raw material, so that the friction performance of friction material is improved after a C/C composite is formed, and the combination property is excellent.

A method of preparing an annular fibrous preform is also provided, which overcomes the problem of poor structural stability of the friction material after forming a C/C composite when the sector-shaped fibrous fabric is abutted, and improves the in-plane and interlayer uniformity and consistency, of which the overall structure is stable, and property is excellent.

To achieve the first object of the present invention mentioned above, the present invention provides the following technical solution: an annular fibrous preform, said preform is a quasi-three-dimensional fabric formed by superposing and needle-punching an annular unit, said annular unit is an annular composite fabric shaped by subjecting an annular fibrous fabric and an annular fibrous web to needle-punching in advance, or is a ring formed by superposing and needle-punching an annular composite fabric with an annular fibrous web; said annular fibrous web is formed of chopped fiber felts or chopped pre-oxidized filament felts.

Furthermore, said annular fibrous fabric is formed by abutting 2 to 6 identical sector-shaped fibrous fabrics.

Furthermore, said annular composite fabric has a long fiber content of 50% to 90%. Furthermore, said fibrous fabric has a surface density of 120 to 450 g/m$^2$, and a fiber specification of 50K, 48K, 24K, 12K, 6K, 3K, 1K.

Furthermore, said chopped carbon fiber felts or chopped pre-oxidized fiber felts have a surface density of 20 to 300 g/m², and a fiber specification of 320K, 50K, 48K, 24K, 12K Furthermore, said annular fiber preform has an interlayer density of 10 to 18 layers/cm, and a long fiber content of 45 to 85%.

Furthermore, said preform has a volume density of 0.35 to 0.70 g/cm³.

To achieve the second object of the present invention mentioned above, the present invention provides the following technical solution: employing needle-punching and forming process that involves shaping by needle-punching in advance, such that an annular fibrous fabric is needle-punched in advance with an annular fibrous web and fixedly joined into an annular composite fabric, and then needle-punching said annular composite fabric to form an annular unit or needle-punching said annular composite fabric superposed with an annular web to form an annular unit, superposing and needle-punching said annular unit to form a quasi-three-dimensional fabric, namely an annular fibrous preform.

Furthermore, said method of preparing an annular fibrous preform comprises the following specific steps:

(1) cutting a fibrous fabric into a shape of sector, and abutting the same to form an annular fibrous fabric;

(2) shaping said annular fibrous fabric from step (1) with an annular fibrous web by needle-punching in advance to form an annular composite fabric having a needle-punching density of 2 to 6 needles/cm²; or superposing and needle-punching an annular composite fabric with an annular fibrous web to form a ring;

(3) superposing said annular composite fabric or ring from step (2), staggering the abutting seam by rotation; and introducing the Z-oriented fibers in between the superposing layers by needle-punching process at a needle-punching density of 15 to 35 needles/cm²; giving an annular fibrous preform.

Said method of preparing an annular fibrous preform employs the needle-punching and forming process that involves shaping by needle-punching in advance, such that an annular fibrous fabric of abutted sector-shaped fibrous fabric is needle-punched in advance with an annular fibrous web and fixedly joined into an annular composite fabric, and then needle-punching to form an annular unit, to realize the preparation of the annular fibrous preform, which comprises the following specific steps:

(1) Design of fabric width. To meet the product size requirements and to reduce wastage of surrounding materials and to effectively control the utilization of remaining materials under a particular cutting design. To design the width of the fibrous fabric and the web according to the requirements for product size and cutting angle of the sector-shaped fibrous fabric such that the material left behind in the margin from the cutting edge is controlled in less than 10 mm.

(2) Preparation of fibrous fabric and web. To select a fibrous material of a particular specification according to the requirements for the product performance and structural requirements to prepare the fibrous fabric and web having the desired surface density.

(3) Sector-shaped cutting. For the same purpose as the prior art, the size and quantity of the sector-shaped fibrous fabric are designed according to the requirements for the product specification and structural properties, and to obtain the sector-shaped fibrous fabric in accordance with the selected cutting design. For example, an annular fibrous preform sized of φ500 mm×φ300 mm is prepared by cutting in three different cutting designs a, b, c as shown in FIG. 4, where the utilization rate of the raw materials are 40%-55%, 50%-65%, 60%-75%, respectively. The practice indicated that the smaller is the sector angle, the higher is the product quantity of a batch production and the higher is the utilization rate of the raw materials. The method is simple, easy to operate, easy to control, suitable for automated preparation, capable of avoiding the loss of a large quantity of materials caused by cutting into annular pieces from intact square or circular pieces. In addition, in order to meet the design requirements for the product structure and properties, a sufficient amount of continuous long fiber distributed in a certain trace is retained, sector-shaped cutting can be conducted according to FIG. 5, in which the central axis of the sector and the fibrous fabric in the warp direction may have an included angle N of 0° or 90° or any values in between.

(4) Shaping by needle-punching in advance. An annular shape is formed by abutting sector-shaped fibrous fabrics, followed by needle-punching in advance with an annular web to shape and to give an annular composite fabric having a needle-punching density of 2-6 needles/cm². The method eliminates the occurrence of deformation and misplacement of sector-shaped abutted annular fibrous fabric during needle-punching at a later stage, and that needle-punching in advance achieves good fixing and joining between the planar multiple sector-shaped fibrous fabrics and between the sector-shaped abutted annular fibrous fabric and an annular fibrous web, and to form an annular shape using sector-shaped fibrous fabrics of the same type, both effectively improve the in-place and interlayer uniformity and consistency, of which the overall structure is stable, and the structural performance of the friction material after forming into composite is good.

(5) Rotational superposing Annular composite fabrics are superposed in such a manner that the abutting seams are staggered by rotation according to the designed angle, as shown in FIG. 6; meanwhile, in the case an annular unit is formed of sector-shapely abutted annular fibrous web and annular composite fabric, the sector-shaped abutting seams of the superimposed adjacent layers are staggered; all these methods can eliminate the influences caused by the overlapped abutting seams on the mechanical performance of the preform, and at the same time improve the isotropy of the preform material to meet the requirements for the shock resistance of brakes.

(6) Needle-punching to form. Introducing the Z-oriented fibers by needle-punching to achieve bonding multiple annular units together at a needle-punching density of 15-35 needles/cm². Experiments indicated that circular needle-punching station is complex with great technical difficulty, tends to cause multiple times of repeated needle-punching and affects the material performance; while the use of large-sized flat needle-punching can achieve mass production with high degree of automation; meanwhile changing the needle arrangement by rotating the preform can avoid re-weakening of performance caused by repeated needle-punching at the same position, so as to achieve even distribution of the Z-oriented fibers and to improve the isotropy of the preform materials in achieving high overall uniformity of the materials.

(7) Repeating steps (5) and (6) to obtain an annular fibrous preform of the present invention, the thus-formed annular fibrous preform after the C/C composite is formed can be processed into the desired shape and size in accordance with the design requirements.

It is commonly known that the isotropy of the preform material determines the structural reliability and performance stability of the material. In order to reasonably characterize the preform performance, selection and preparation of the samples for performance testing is critical. In the present invention, mechanical properties of the preform mainly include the in-plane tensile property and interlayer tensile and shearing property. In-plane tensile properties mainly includes axial radial direction and the planar tangential direction of the braking force, where the interlayer bonding strength may be characterized by the bonding strength of the Z-oriented fibers at different locations. The interlayer shearing property may be characterized by T-typed peel strength. Testing samples are prepared as shown in FIG. 7, which provides references for the overall performance of the later composites.

The present invention provides a preform having the thickness and volume density meeting the desired requirements by superposing and needle-punching the annular units comprising an annular composite fabric. An annular composite fabric is shaped by having the sector-shaped fibrous fabrics of the same type needle-punched in advance with an annular fibrous web to achieve compositing the annular fibrous fabric which is abutted by sector-shaped segments with the annular fibrous web at low density needle-punching. The method has less fiber damage, and effective in fixing and joining adjacent sector-shaped segments of an individual layer, capable of eliminating the occurrence of deformation and misplacement of the sector-shaped abutted fibrous fabric during needle-punching at a later stage, which overcomes the problem of poor structural stability of the friction material after forming a C/C composite caused by abutting the sector-shaped fibrous fabric, and improves the in-plane and interlayer uniformity and consistency; the individual layers of the annular fibrous fabric are formed of sector-shaped fibrous fabric of the same type, which further improves the overall uniformity of the preform. In addition, an annular composite fabric is rotationally superposed to stagger the abutting seam, and that raw materials of the same type are used in the process of preparation, which all result in the improvement of the isotropy of the preform. As comparing with the conventional 0°/90° overlaying structure, the present invention provides a strong fiber cohesion which ensures good mechanical characteristics of the in-plane fibers; meanwhile, the sector-shaped abutted annulus effectively reduces the material loss caused by cutting from an intact circular or square piece. The method improves the long fiber content on the rotating plane in the tangential direction of the braking force which ensures good friction performance of the composite material after the C/C composite is formed. In general, the preform of the present invention has a stable structure, excellent performance, high fiber content, high utilization rate of raw material, and that the preform due to the improved friction performance of the composite material after the C/C composite is formed has good overall properties. The preform has an interlayer density of 10-18 layers/cm, long fiber content of 45-85%, volume density of 0.35-0.70 g/cm$^3$, utilization rate of the raw material of 55%-75%. The method can be applied to the production of composite material preforms for aircraft brake discs, and can also be applied to the production of friction material preforms in baking systems of high-speed trains and high-end automobiles.

DETAILED DESCRIPTION OF THE EMBODIMENTS

Detailed description to the present invention will now be given with reference to the drawings and the examples as set forth below, of which the description in this section is by way of illustration and exemplification of the present invention, and is not to be taken by way of limitation of the scope of protection of the present invention.

EXAMPLE 1

Figure 1:
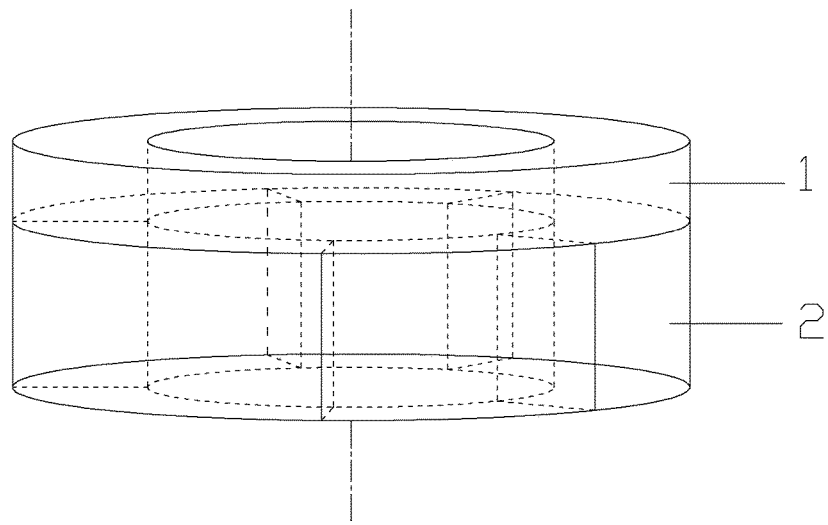
FIG. 1 shows schematically the structure of an annular composite fabric, 1 represents an annular fibrous web, 2 represents an annular fibrous fabric.
Figure 2:
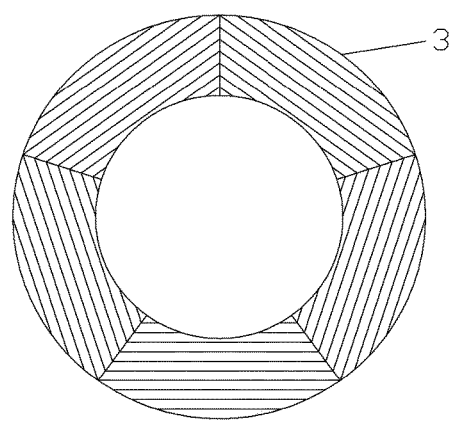
FIG. 2 shows schematically an annular fibrous fabric, 3 represents a sector-shaped fibrous fabric.
Figure 3:
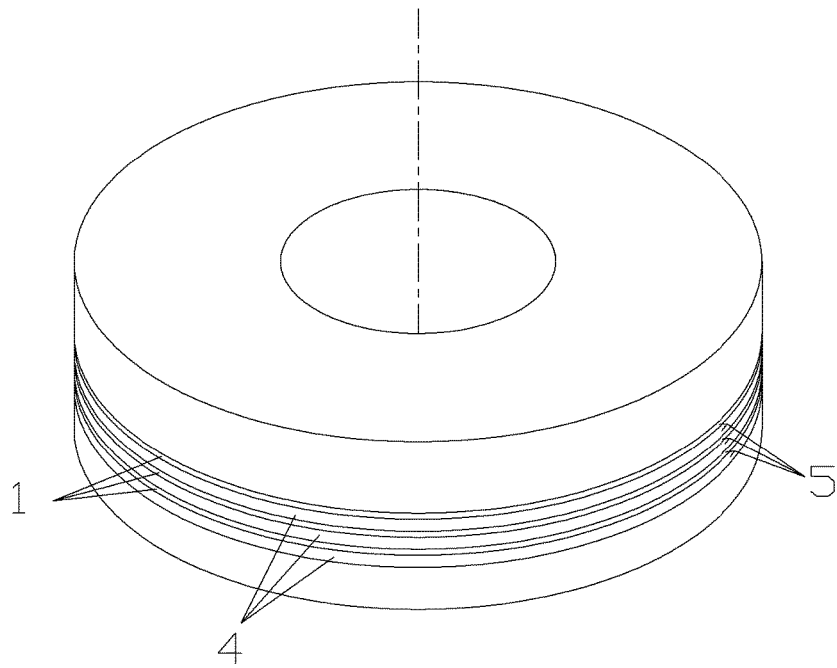
FIG. 3 shows schematically the structure of an annular fibrous preform, 4 represents an annular composite fabric, 5 represents an annular unit.
Figure 4:
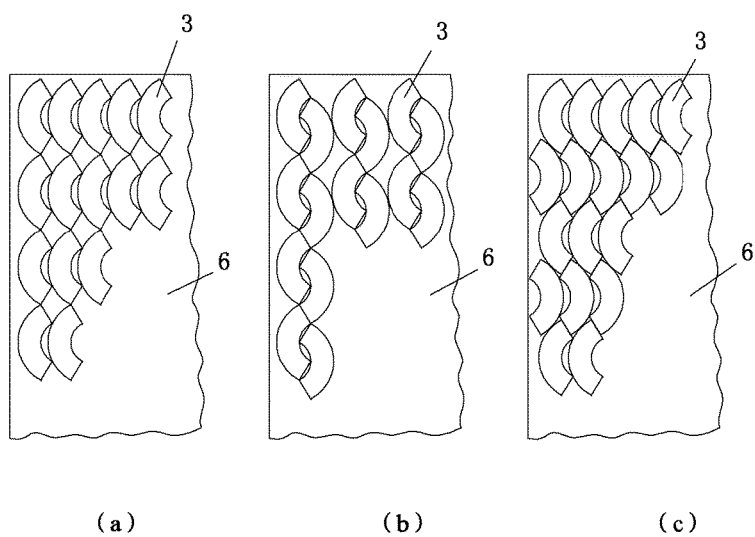
FIG. 4 shows schematically the cutting of a sector-shaped fibrous fabric, a, b, c represents three different cutting designs, 6 represents a fibrous fabric.
Figure 5:
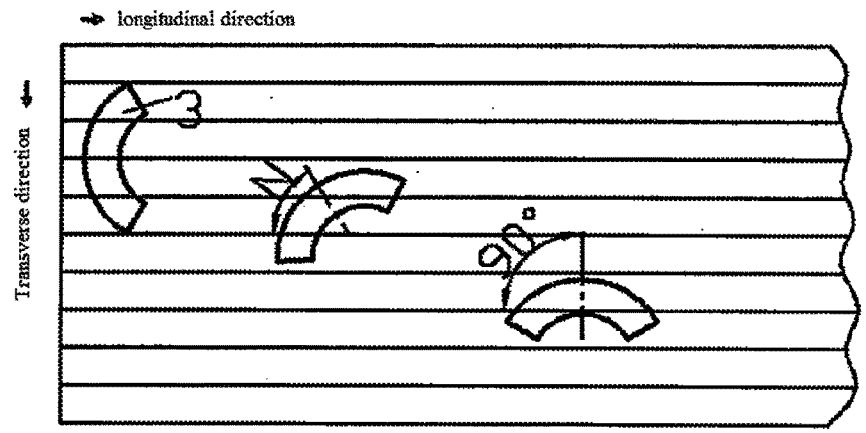
FIG. 5 shows schematically the cutting angle of a sector-shaped fibrous fabric, N represents the included angle between the central axis line of the sector-shaped fibrous fabric and the fibrous fabric in the wrap direction.
Figure 6:
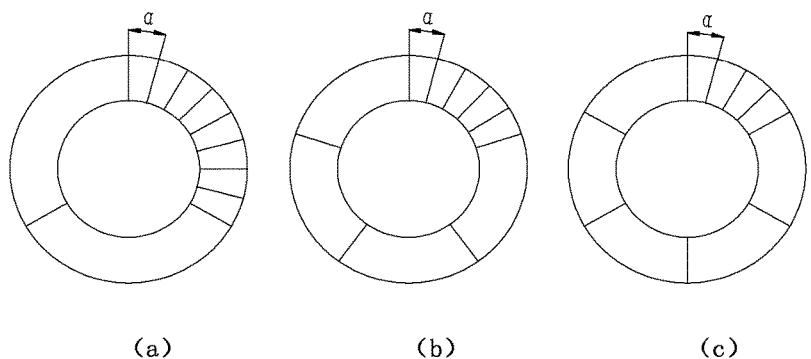
FIG. 6 shows schematically the staggering of an annular composite fabric from the abutting seam, a represents the ring formation from three abutted sector-shaped segments, b represents the ring formation from five abutted sector-shaped segments, c represents the ring formation from six abutted sector-shaped segments, α represents the rotation angle.

A pre-oxidized fibrous plain woven fabric and a chopped pre-oxidized fibrous web with a surface density of 420 g/m$^2$, 90 g/m$^2$, respectively, are prepared from a 48K pre-oxidized fiber; the size of the sector-shaped fibrous fabric is designed as φ470 mm×φ180 mm (sector angle of 120°) in accordance with the cutting design as shown in FIG. 4(b); three pieces of sector-shaped fibrous fabric are abutted into an annular shape, said chopped pre-oxidized fibrous web is directly cut into an annular shape, a shaped annular composite fabric is obtained at a needle-punching density of 5 needles/cm$^2$; annular composite fabrics are alternatively superposed, and subjected to needle-punching at a needle-punching density of 25 needles/cm$^2$; an annular composite fabric is rotationally superposed in accordance with FIG. 6(a), each repeating structural unit comprises eight annular units, the included angle of the abutting seam is designed as 15°; an annular pre-oxidized fibrous preform having a final size of 450 mm×φ200 mm×22 mm is obtained, which has an interlayer density of 12.7 layers/cm, a long fiber content of 82%, a volume density of 0.65 g/cm$^3$, an utilization rate of raw material of 58%.

EXAMPLE 2

Figure 7:
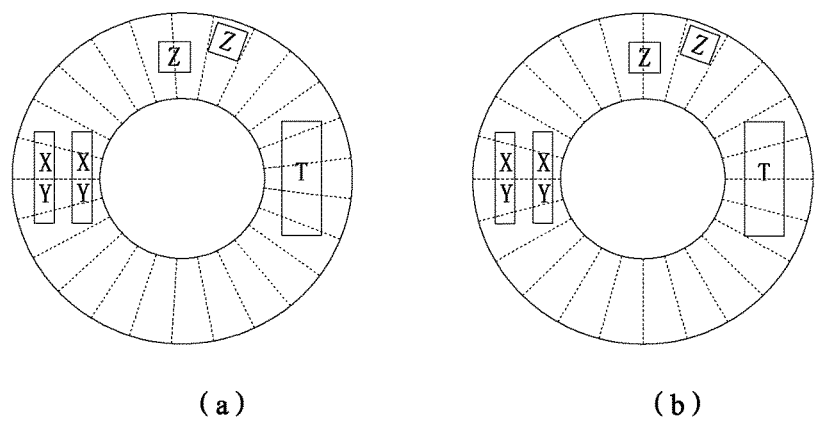
FIG. 7 shows schematically the sampling of an annular fibrous preform for performance testing. XY is for testing the tensile property in the tangential direction of the braking force, T is for testing the T-typed peel property, Z is for testing the interlayer bonding strength, the rotation angle in a in which five segments are abutted and superposed is 14°, the rotation angle in b in which six segments are abutted and superposed is 15°.

A chopped carbon fiber web and an uni-directional fabric with a surface density of 40 g/m$^2$, 280 g/m$^2$, respectively, are prepared from a 12K PAN-based carbon fiber; the size of the sector-shaped fibrous fabric is designed as φ520 mm×φ170 mm (sector angle of 72°) in accordance with the cutting design as shown in FIG. 4(a); five sector-shaped fibrous fabric segments are abutted into an annular shape, chopped carbon fiber web is directly cut into an annular shape, a shaped annular composite fabric is obtained at a needle-punching density of 3 needles/cm$^2$; the annular composite fabric and the annular fibrous web are alternatively superposed to form an annular unit, and the same are subjected to needle-punching at a needle-punching density of 30 needles/cm$^2$; the annular composite fabric is superposed in accordance with FIG. 6(b), each repeating structural unit comprises five annular units, the included angle of the abutting seam is designed as 14°; an annular carbon fiber preform having a final size of φ500 mm×φ190 mm×24 mm is obtained, which has an interlayer density of 14.3 layers/cm, a long fiber content of 78%, a volume density of 0.53 g/cm$^3$, an utilization rate of raw material of 62%. Testing samples are taken in accordance with FIG. 7(a), the average value of the tensile strength of the tangential planar of preform's braking force is determined as 3.12 MPa, the average value of the T-typed peel strength is determined as 0.818 KN/m and the average value of the Z-oriented bonding strength is determined as 0.087 MPa.

EXAMPLE 3

50K and 24K of PAN-based carbon fiber are used, respectively, as the raw material to prepare an uni-directional fabric and chopped fiber web with a surface density of 180 g/m$^2$, 90 g/m$^2$, respectively; the size of the sector-shaped fibrous fabric is designed as φ540 mm×φ80 mm (sector angle of 60°); a sector-shaped fibrous fabric and a sector-shaped web are prepared in accordance with the cutting design as shown in FIG. 4(c). Six sector-shaped fibrous fabric segments or web segments are abutted into an annular shape; the annular fibrous fabric is superimposed with the annular fibrous web with their abutting seam being staggered at an angle of 30°. A shaped annular composite fabric is obtained at a needle-punching density of 2 needles/cm$^2$; annular composite fabrics are alternatively superposed, and the same is subjected to needle-punching at a needle-punching density of 25 needles/cm$^2$; the annular composite fabrics are superposed in accordance with FIG. 6(c), each repeating structural unit comprises four annular composite fabrics, the included angle of the abutting seams is set as 15°; an annular carbon fiber preform having a final size of φ520 mm×φ100 mm×35 mm is obtained, which has an interlayer density of 17.7 layers/cm, a long fiber content of 67%, a volume density of 0.48 g/cm$^3$, an utilization rate of raw material of 70%; testing samples are taken in accordance with FIG. 7(b), the average value of the tensile strength of the tangential planar of preform's braking force is determined as 2.84 MPa, the average value of the T-typed peel strength is determined as 0. 832 KN/m and the average value of the Z-oriented bonding strength is determined as 0.088 MPa.

What is claimed is:

1. A method of preparing an annular carbon fibrous preform comprising;
   (1) providing a fibrous fabric and cutting the fibrous fabric into sector-shaped segments, and abutting the sector-shaped segments to form an annular fibrous fabric;
   (2) pre-needle punching the annular fibrous fabric from step (1) with annular carbon fibrous felts at a needle punching density of 2 to 6 needles/cm$^2$ such that the annular fibrous fabric and annular carbon fibrous felts is fixed and shaped into an annular composite fabric;
   (3) superimposing the annular composite fabric from step (2) with annular carbon fibrous felts and then subjecting the same to needle punching to form distinct layers of annular unit;
   (4) superposing layers of annular unit from step (3) in a manner that abutting seams of the superposed adjacent layers are staggered by rotation according to a designed angle; and
   (5) introducing Z-oriented fibers among the superposed layers by needle punching to achieve bonding multiple annular units together at a needle-punching density of 15 to 35 needles/cm$^2$ to form an annular carbon fibrous preform.

2. A method of preparing an annular carbon fibrous preform according to claim 1, wherein said annular fibrous fabric is formed by abutting 2 to 6 identical sector-shaped segments.

3. A method of preparing an annular carbon fibrous preform according to claim 1, wherein said annular fibrous fabric has a Mass Per Unit Area of 120 to 450 g/m$^2$, and a fiber specification of 50K, 48K, 24K, 12K, 6K, 3K or 1K.

4. A method of preparing an annular carbon fibrous preform according to claim 1, wherein said annular carbon fibrous felts has a Mass Per Unit Area of 20 to 300 g/m$^2$, and a fiber specification of 320K, 50K, 48K, 24K or 12K.

5. A method of preparing an annular carbon fibrous preform according to claim 1, wherein said annular carbon fibrous preform has 10 to 18 layers/cm in the Z-oriented direction of the annular unit layer, and a continuous fiber content of 45% to 85%.

6. A method of preparing an annular carbon fibrous preform according to claim 1, wherein said annular carbon fibrous preform has a volume density of 0.35 to 0.70 g/cm$^3$.

* * * * *